Sept. 7, 1926.  
G. NIETO  
1,599,143  
NONSKIDDING DEVICE AND BRAKE FOR AUTOMOBILES  
Filed Sept. 16, 1925

INVENTOR.  
Gregorio Nieto  
BY  
ATTORNEYS.

Patented Sept. 7, 1926.

1,599,143

UNITED STATES PATENT OFFICE.

GREGORIO NIETO, OF SAN ANTONIO, TEXAS.

NONSKIDDING DEVICE AND BRAKE FOR AUTOMOBILES.

Application filed September 16, 1925. Serial No. 56,563.

This invention relates to improvements in automobile brakes, and it is the principal object of the invention to provide a brake having a plurality of road engaging teeth adapted to be operated from the seat of the driver in cases of emergency and on slippery roads, to positively and almost instantaneously brake the car.

Another object of the invention is the provision of an automobile brake of this type allowing an elevation of the road engaging teeth above the road bed and also a limited change of the angle of engagement between road and teeth.

A further object of the invention is the provision of a brake of simple and inexpensive construction, yet durable and positively acting.

These and other objects and advantages of the invention will become more fully known as the description thereof proceeds, and will then be specifically pointed out in the appended claims.

In the accompanying drawing, forming a material part of this disclosure:

Figure 1:
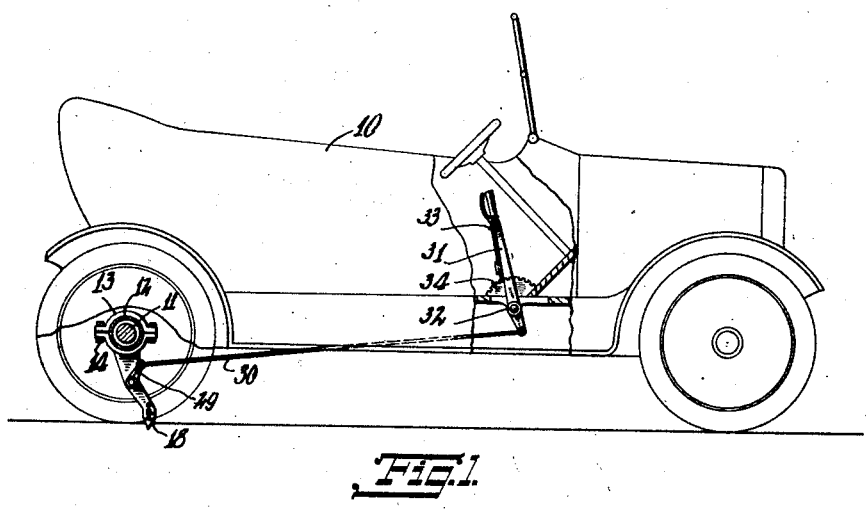
Figure 1 is a side elevation of an automobile equipped with a brake constructed according to the present invention.
Figure 2:
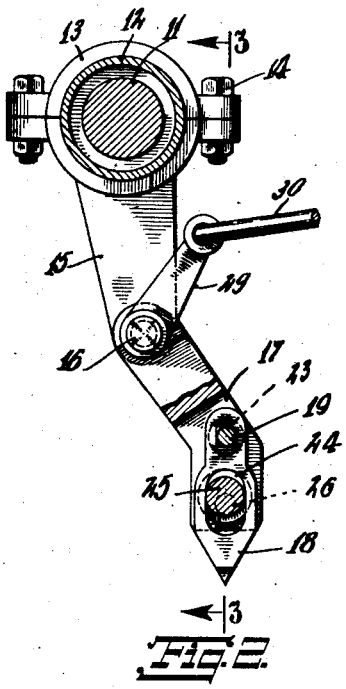
Figure 2 is a sectional side elevation of a brake according to the invention on an enlarged scale.
Figure 3:
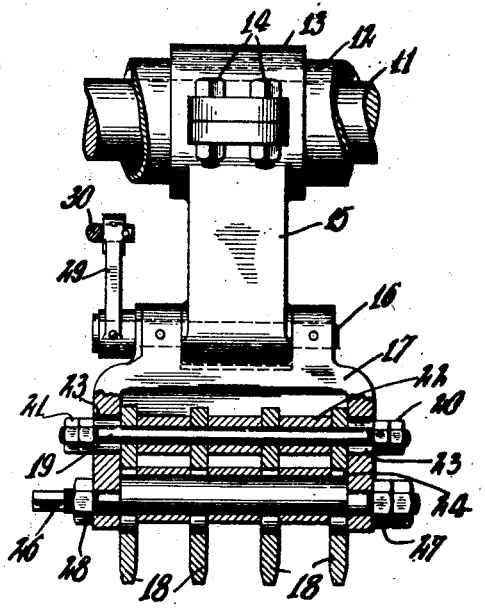
Figure 3 is a section taken on line 3—3 of Fig. 2.

A car 10 of any well known type has attached to its rear axle 11 a sleeve 12 to which clamp bands 13 are secured, held in place thereon by a plurality of nut bolts 14 passed through the meeting flanges of the bands. With these bands the body 15 of the brake is formed.

To the lower end of the body 15 is pivotally attached, as at 16, a bracket 17 carrying a plurality of road engaging teeth 18 held between the depending arms of bracket 17 by means of a pin 19 carrying counter nuts 20, 21 at its projecting ends, while sleeves 22 separate the single teeth 18. A certain play is allowed in the elongated slots 23 of the bracket arms for the bolt 19.

The bodies of the teeth 18 have each an elongated slot 24 formed therein in which a cam 25 on the bolt 26 is provided so that a certain limited lateral play of the teeth is possible. The bolt 26 carries at its projecting ends nuts 27, 28.

To the pivot pin 16 is attached the lower end of an operating link 29 having secured to its opposite end a draw rod 30, the other end of which is secured to the lower end of an operating lever 31 pivoted intermediate its ends, as at 32, to the car frame, and lever 31 is equipped with the usual type of locking member 33 engaging between the teeth of a toothed segment 34.

The operation of the device will be entirely clear from the above description, upon the proper manipulation of lever 31 the brake teeth can be brought into engagement with the road bed or elevated thereabove whereupon the lever is locked in its adjusted position. On account of the cam action a limited regulation of the angle of engagement between the teeth and the road bed is possible.

While I have shown and described the preferred form of the invention as an example of the many ways in which the same may be practically constructed, it is to be understood, that such changes as fall within the scope of the claims may be made without departure from the spirit of the invention.

Having thus described my invention, what I claim as new, and desire to secure by Letters Patent is:

1. Automobile brake comprising a plurality of teeth adapted to engage the road, a holding means for supporting said teeth, allowing a play of the same, means for securing said brake to the automobile, means for allowing a change of the angle of engagement between said teeth and the road, and an operating lever for operating the brake from the seat of the driver.

2. Automobile brake comprising a bracket, depending arms on said bracket having lateral longitudinal or elongated perforations, means for attaching said bracket to a car, a plurality of teeth adapted to engage the road with their lower ends, means mounted for play in said bracket for holding said teeth, a means for allowing a certain limited adjustment of the angle of engagement between said teeth and the roadbed, and a means adapted to be locked for operating said brake from the seat of a driver.

3. Automobile brake comprising a bracket, means for securing said bracket to the rear axle of the automobile, to which said bracket is pivotally attached, a plurality of teeth mounted for limited motion in said bracket, means for separating the single teeth, said teeth having elongated slots formed therein, a cam playing in said slots for allowing a limited adjustment of the angle of engagement between teeth and road, and a means for operating said brake from the driver's seat.

In testimony whereof I have affixed my signature.

GREGORIO NIETO.